US008822567B2

(12) United States Patent
Kono et al.

(10) Patent No.: US 8,822,567 B2
(45) Date of Patent: Sep. 2, 2014

(54) METHOD OF PRODUCING SOIL CEMENT SLURRY

(75) Inventors: Takao Kono, Inzai (JP); Toshio Yonezawa, Inzai (JP); Eiji Sato, Inzai (JP); Tomonori Yoshida, Inzai (JP); Mitsuo Kinoshita, Gamagori (JP); Shinji Tamaki, Gamagori (JP)

(73) Assignee: Takemoto Yushi Kabushiki Kaisha, Gamagori, Aichi (JP)

( * ) Notice: Subject to any disclaimer, the term of this patent is extended or adjusted under 35 U.S.C. 154(b) by 160 days.

(21) Appl. No.: 13/611,303

(22) Filed: Sep. 12, 2012

(65) Prior Publication Data

US 2013/0023606 A1    Jan. 24, 2013

Related U.S. Application Data

(60) Division of application No. 13/028,748, filed on Feb. 16, 2011, now abandoned, which is a continuation of application No. PCT/JP2010/059699, filed on Jun. 8, 2010.

(30) Foreign Application Priority Data

Jun. 9, 2009  (JP) ................................ 2009-138002

(51) Int. Cl.
| | | |
|---|---|---|
| C09K 17/00 | (2006.01) | |
| C04B 24/26 | (2006.01) | |
| C08K 3/00 | (2006.01) | |
| C09K 17/40 | (2006.01) | |
| C09K 17/10 | (2006.01) | |
| C04B 28/04 | (2006.01) | |
| C04B 111/00 | (2006.01) | |

(52) U.S. Cl.
CPC ....... *C09K 17/40* (2013.01); *C04B 2111/00732* (2013.01); *C09K 17/10* (2013.01); *C04B 28/04* (2013.01)
USPC .............................................. 523/132; 524/5

(58) Field of Classification Search
USPC ....................................... 523/131, 132; 524/5
See application file for complete search history.

(56) References Cited

U.S. PATENT DOCUMENTS

| 4,306,912 A | 12/1981 | Forss |
| 5,661,206 A | 8/1997 | Tanaka et al. |
| 2011/0136946 A1 | 6/2011 | Kono et al. |

FOREIGN PATENT DOCUMENTS

| JP | 58-194977 | 11/1983 | | |
| JP | 2000-169209 | 6/2000 | | |
| JP | 2001-270748 | 10/2001 | | |
| JP | 2003049166 A | * 2/2003 | ............. | C09K 17/10 |
| JP | 2006057050 A | * 3/2006 | ............. | C09K 17/10 |
| JP | 2006-131671 | 5/2006 | | |
| JP | 2008-120892 | 5/2008 | | |
| JP | 2009-035453 | 2/2009 | | |
| JP | 2009079161 A | * 4/2009 | ............. | C09K 17/02 |

OTHER PUBLICATIONS

Computer generated English translation of JP 2006-057050 A, Kiyota et al., Mar. 2, 2006.*
Computer generated English translation of JP 2009-035453 A, Sato et al., Feb. 19, 2009.*
Computer generated English translation of JP 2003-049166 A, Kiyota et al., Feb. 21, 2003.*
English translation of JP 58-194977 A, Ando et al., Nov. 14, 1983.*
Computer generated English translation of JP 2009-079161 A, Udagawa et al., Apr. 16, 2009.*
Derwent Abstract of JP 58-194977 A, Ando et al., Dec. 1983.
Computer generated English translation of JP 2006-131671 A, Sato et al., May 25, 2006.
U.S. Appl. No. 13/028,748, Office Action mailed Jan. 30, 2012.
U.S. Appl. No. 13/028,748, Office Action mailed Jun. 27, 2012.

* cited by examiner

*Primary Examiner* — Peter F Godenschwager
*Assistant Examiner* — David Karst
(74) *Attorney, Agent, or Firm* — Weaver Austin Villeneuve & Sampson LLP

(57) ABSTRACT

Soil cement slurry is produced by mixing blast-furnace slag fine particles with a specified fineness and Portland cement at a specified ratio to prepare blast-furnace slag cement and using a specified amount of slurry composition for ground improvement including this blast-furnace slag cement with water and an admixture per 1 m³ of ground. The admixture contains specified amounts of a hardening accelerator, a defoamer and a fluidizer.

3 Claims, No Drawings

METHOD OF PRODUCING SOIL CEMENT SLURRY

This application is a divisional of and claims the benefit of U.S. patent application Ser. No. 13/028,748, which was filed on Feb. 16, 2011, is titled "Slurry Compositions for Ground Improvement Using Blast-Furnace Slag Cement and Method of Producing Soil Cement Slurry by Using Same", is incorporated herein by reference, and is a continuation of International Application No. PCT/JP2010/059699, filed Jun. 8, 2010, priority being claimed on Japanese Patent Application 2009-138002 filed Jun. 9, 2009.

BACKGROUND OF THE INVENTION

This invention relates to slurry compositions for ground improvement using blast-furnace slag cement and a method of producing soil cement slurry by using such slurry compositions.

In recent years, the demand for reducing the emission rate of carbon dioxide and improving efficient energy consumption is becoming increasingly stronger. Under this condition, blast-furnace slag as by-product from steel mills is being effectively used as material for blast-furnace slag cement in the form of blast-furnace slag fine particles in mountain stationary construction, underground water stop construction and soft ground improvement construction works. Generally, when such a ground improvement work is carried out, cement slurry with a mixture of cementatious stabilizer and water (cement milk) is injected into the ground and a drilling and kneading machine is used to mix and stir it with the ground at the site, and blast-furnace slag cement is used here as the cementatious stabilizer. Blast-furnace slag cement is usually produced by mixing blast-furnace slag fine particles into normal portland cement and is usually divided according to the JIS-R5211 standard into the following three kinds, depending on the amount of the blast-furnace slag fine particles: Type A (over 5% to 30%), Type B (over 30% to 60%) and Type C (over 60% to 70%). Type B with a good balance in characteristics is usually used when actual ground improvement is done.

For ground improvement, Type B blast-furnace slag cement is normally mixed into 1 $m^3$ of ground at a rate of 100-400 kg, but since about 400 kg of carbon dioxide is emitted for producing 1 ton of Type B blast-furnace slag cement, this means that 40-160 kg of carbon dioxide is emitted for improving 1 $m^3$ of ground by using Type B blast-furnace slag cement, exclusive of the emission of carbon dioxide generated by the operation of construction machines, transportation of materials, etc. For this reason, in the field of carrying out ground improvement, there have been demands for the development of technology for suppressing the generation of carbon dioxide by using blast-furnace slag cement at a higher rate, while maintaining workability and the prerequisite that the ground to be improved gain the necessary strength.

The present invention relates to slurry compositions for ground improvement using blast-furnace slag cement that can respond to such demands, as well as a method of producing soil cement slurry using such compositions.

Regarding the effects of the conventional use of portland cement for ground improvement, it has been reported, for example, in "Manual for Ground Improvement by Cementatious Stabilizer" (1984) pages 42-44, edited by the Cement Association of Japan, that portland cement is alkaline because calcium hydroxide is generated when it comes into contact with water and, if it is used for ground improvement, the pH of the ground increases up to 10, adversely affecting the growth of plants, etc. and that, if portland cement is used for improving ground with low water content such as a loamy layer, it becomes easier for hexavalent chromium in the portland cement to elute, adversely affecting the environment. Besides the above, there have been proposals for the improvement of fluidity of cement slurry used for ground improvement such as those in Japanese Patent Publications Tokkai 11-256161, 2000-169209 and 2006-298726, as well as for hydraulic compositions using blast-furnace slag, etc. usable also for ground improvement such as those in Japanese Patent Publications Tokkai 62-158146, 63-2842, 1-208354, 10-114555 and 2002-241152, but there have been no detailed reports or proposals contributing to the reduction in emission of carbon dioxide.

SUMMARY OF THE INVENTION

It is therefore an object of this invention to provide slurry compositions for ground improvement capable of reducing the generation of carbon dioxide by using blast-furnace slag cement at a higher rate than being done at present such that the workability of ground improvement work is maintained and the ground would gain necessary strength, as well as a method of producing soil cement slurry using such compositions.

The inventors herein have discovered as a result of their diligent studies in view of the aforementioned object of the present invention that slurry compositions for ground improvement using together with an admixture a specified kind of blast-furnace slag cement containing blast-furnace slag fine particles at a higher rate and portland cement at a correspondingly lower rate, as well as a method of producing soil cement slurry using such compositions are correctly responsive to the object of the present invention.

DETAILED DESCRIPTION OF THE INVENTION

The present invention relates to slurry compositions for ground improvement, comprising at least cement, water and an admixture, the cement being blast-furnace slag cement comprising blast-furnace fine particles with fineness 3000-13000 $cm^2/g$ in an amount of 60-80 mass % and portland cement in an amount of 20-40 mass % so as to be together 100 mass %, the slurry compositions being produced by mixing water with this blast-furnace slag cement at a mass ratio of 40-250% and containing the admixture in an amount of 0.1-5 mass parts per 100 mass parts of this blast-furnace slag cement.

The present invention also relates to a method of producing soil cement slurry characterized as using slurry compositions for ground slurry using blast-furnace slag cement according to this invention at a rate of 300-1200 kg per 1 $m^3$ of ground.

A slurry composition for ground improvement using blast-furnace slag cement (hereinafter referred to as a slurry composition of this invention) is characterized as comprising at least cement, water and an admixture. The slurry composition of this invention uses blast-furnace slag cement of a special kind and such blast-furnace slag cement is characterized as containing blast-furnace slag fine particles with fineness 3000-13000 $cm^2/g$ in an amount of 60-80 mass % and portland cement in an amount of 20-40 mass % such that their total would be 100 mass % but those containing blast-furnace slag fine particles in an amount of 64-76 mass % and portland cement in an amount of 24-36 mass % such that their total would be 100 mass % are preferable.

Use is made of blast-furnace slag fine particles with fineness in the range of 3000-13000 $cm^2/g$ but those with fineness in the range of 3000-8000 cm²/g are preferable and those with fineness in the range of 3500-6500 cm²/g are more preferable. If those with fineness outside the range of 3000-13000 cm²/g are used, the fluidity of the prepared slurry composition may be poor or the resultant ground strength may be lowered. The fineness is herein expressed by the specific surface area by the blain method.

Use as portland cement is usually made of normal portland cement, high early strength portland cement or moderate heat portland cement, but multi-purpose normal portland cement is preferable.

For producing a slurry composition of this invention, the mass ratio of water to blast-furnace slag cement is adjusted to 40-250%, and more preferably to 45-230%. If this mass ratio is greater than 250%, the reduction in the ground strength becomes great. If this mass ratio is less than 40%, on the other hand, the fluidity of the soil cement slurry becomes too low. An admixture is used in a slurry composition of this invention in an amount of 0.1-5 mass parts per 100 mass parts of the blast-furnace slag cement. In the above, the mass ratio between water and blast-furnace cement is the number obtained as ((mass of water used)/(mass of blast-furnace cement used))×100.

Admixtures that may be used in the slurry compositions of this invention include those used in conventionally known kinds of soil cement. Examples of such admixture include fluidizers, hardening accelerators and defoamers.

There is no particular limitation on the fluidizers to be used but those comprising alkali metal salts of water soluble vinyl copolymers obtained by alkali hydrolysis of copolymer between α-olefin and anhydrous maleic acid and having mass averaged molecular weight (throughout herein, pullulan converted weight by gel-permeation chromatography method) of 2000-70000 are preferable and those comprising alkali metal salts of water soluble vinyl copolymers obtained by alkali hydrolysis of copolymer between isobutylene and anhydrous maleic acid are particular preferable.

Examples of preferable fluidizers further include those comprising alkali metal salts of polyacrylic acid with mass averaged molecular weight of 1500-50000 and they can be used in combination with the aforementioned alkali metal salt of water soluble vinyl copolymer. The amount of aforementioned fluidizers to be used is preferably 0.1-4 mass parts to 100 mass parts of blast-furnace slag cement, and more preferably 0.3-3 mass parts.

Examples of hardening accelerator include alkali metal carbonates such as sodium carbonate, potassium carbonate and lithium carbonate. Among these, sodium carbonate is preferable from economic reasons. These hardening accelerators are used for improving the strength manifestation characteristic of the ground hardener obtained by injecting a slurry composition of this invention into ground, drilling and stirring. The amount of hardening accelerator to be used is preferably 0.3-4 mass parts, and more preferably 0.5-3 mass parts, for 100 mass parts of blast-furnace slag cement.

There is no particular limitation on the defoamer to be used but those of polyalkylene glycol monoalkenyl (or alkyl) ether, modified polydimethyl siloxane and trialkyl phosphate can be mentioned. For economic reasons and from the point of view of the degree of manifestation of effects, however, defoamers comprising polyalkylene glycol monoalkenyl ether are preferable. A defoamer is used for eliminating the trouble of foaming when the slurry composition of this invention is produced and also for controlling the air to be dragged in when the slurry composition is injected into the ground for drilling and stirring to thereby improve the strength manifestation of the ground hardener. The amount of defoamer to be used is preferably 0.001-0.1 mass parts, and more preferably 0.002-0.01 mass parts, for 100 mass parts of blast-furnace slag cement.

Slurry compositions of this invention can be prepared by a known method. For example, they may be prepared by a method of mixing specified amounts of blast-furnace slag cement, water and admixture by placing them into a mixer and kneading them together. At this moment, additive materials such as bentonite and fibers and additive agents such as setting retarders and hardening accelerators may be added, if necessary, within the limit of not adversely affecting the effects of this invention.

In a method of fluidizing the soil cement slurry of this invention, soil cement slurry is produced by mixing a slurry composition of this invention described above with ground according to the required fluidity of the soil cement slurry and strength of the ground hardener. At this moment, the slurry composition of this invention is used in an amount of 300-1200 kg, and preferably 400-1100 kg, per 1 m³ of ground.

The present invention has the effect of suppressing the emission of carbon dioxide and controlling the lowering in fluidity of prepared soil cement slurry with time by using blast-furnace slag cement of a specified kind as a cement material together with an admixture in ground improvement such that superior workability can be maintained and the ground hardener can be allowed to manifest necessary strength at the same time.

In what follows, the invention will be explained in terms of some examples but these examples are not intended to limit the scope of the invention. In the following examples, unless otherwise explained, "%" means "mass %", and "parts" means "mass parts".

Part 1 (Preparation of Fluidizer as Admixture)

After water 145 g and 30% caustic soda 470 g were placed in a flask equipped with a stirrer, copolymer of isobutylene and anhydrous maleic acid (isobam 600 (tradename) produced by Kuraray) 395 g was gradually added with stirring while the internal temperature was maintained at 60° C. to obtain alkali metal salt of copolymer by hydrolysis. This was analyzed by using GPC (gel-permeation chromatography) method and found to be sodium salt (p-1) of water soluble vinyl copolymer comprising sodium salt of copolymer of isobutylene and anhydrous maleic acid and having mass averaged molecular weight of 23000. By similar methods, fluidizers (p-2) and (p-3) were prepared.

The fluidizers, hardening accelerators and defoamers used as admixtures in this invention, inclusive of the fluidizers described above, are shown together in Table 1.

TABLE 1

| | Type | Details |
|---|---|---|
| Fluidizer | p-1 | Sodium salt of water soluble vinyl copolymer of isobutylene and anhydrous maleic acid with mass averaged molecular weight = 23000 |
| | p-2 | Potassium salt of water soluble vinyl copolymer of isobutylene and anhydrous maleic acid with mass averaged molecular weight = 65000 |
| | p-3 | Sodium salt of water soluble vinyl copolymer of diisobutylene and anhydrous maleic acid with mass averaged molecular weight = 34000 |
| | p-4 | Sodium salt of polyacrylic acid with mass averaged molecular weight = 21000 |
| | p-5 | Mixture of (p-1) and (p-4) at mass ratio of 2/1 |

TABLE 1-continued

| | Type | Details |
|---|---|---|
| Hardening accelerator | c-1 | Sodium carbonate |
| | c-2 | Potassium carbonate |
| Defoamer | d-1 | Polyalkylene glycol monoalkenyl ether defoamer (AFK-2 (tradename) produced by Takemoto Yushi) |

Part 2 (Preparation of Blast-furnace Slag Cement)

Blast-furnace slag fine particles and portland cement were used under the conditions shown in Table 2 to obtain blast-furnace slag cement (S-1)-(S-4) and (R-1)-(R-3).

TABLE 2

| | Blast-furnace slag cement | | | | |
|---|---|---|---|---|---|
| | Mixture of blast-furnace slag fine particles and portland cement (total of 100 mass parts) | | | | |
| | Blast-furnace slag fine particles | | | Portland cement | |
| Type | Type | Ratio (%) | | Type | Ratio (%) |
| S-1 | sg-1 | 70 | | pc-1 | 30 |
| S-2 | sg-1 | 75 | | pc-1 | 25 |
| S-3 | sg-2 | 65 | | pc-1 | 35 |
| S-4 | sg-1 | 70 | | pc-2 | 30 |
| R-1 | sg-1 | 85 | | pc-1 | 15 |
| R-2 | sg-1 | 45 | | pc-1 | 55 |
| R-3 | sg-3 | 30 | | pc-1 | 70 |

In Table 2:
sg-1: Blast-furnace slag fine particles with fineness 4100 $cm^2/g$
sg-2: Blast-furnace slag fine particles with fineness 5900 $cm^2/g$
sg-3: Blast-furnace slag fine particles with fineness 1020 $cm^2/g$
pc-1: Normal portland cement
pc-2: High early strength portland cement Part 3 (Preparation of Slurry Compositions for Ground Improvement)

TEST EXAMPLES 1-8 AND COMPARISON EXAMPLES 1-6

Specified amounts of blast-furnace slag cement shown in Table 2 and kneading water (faucet water) were placed in a forced mixing pan-type mixer under conditions shown in Table 3 and specified amounts of fluidizer, hardening accelerator and defoamer shown in Table 1 as admixtures were also placed inside to be kneaded together to prepare each example of slurry composition for ground improvement.

TABLE 3

| | | Slurry compositions for ground improvement | | | | | |
|---|---|---|---|---|---|---|---|
| | | | Ratio of slurry composition (total = 100%) | | Admixtures | | |
| | Type | Mass ratio (%) of water/blast-furnace slag cement (%) | Blast-furnace slag cement (type/used amount (%)) | Water (used amount (%)) | Fluidizer (type/used amount (%)) | Hardening accelerator (type/used amount (%)) | Defomer (type/used amount (%)) |
| TE-1 | SL-1 | 200 | S-1/33.3 | 66.7 | p-1/0.4 | c-1/2.5 | d-1/0.005 |
| TE-2 | SL-2 | 200 | S-2/33.3 | 66.7 | p-2/0.4 | c-1/2.5 | d-1/0.005 |
| TE-3 | SL-3 | 200 | S-3/33.3 | 66.7 | p-3/0.4 | c-1/2.5 | d-1/0.005 |
| TE-4 | SL-4 | 200 | S-1/33.3 | 66.7 | p-4/0.4 | c-2/2.5 | d-1/0.005 |
| TE-5 | SL-5 | 100 | S-1/50 | 50 | p-5/1.8 | c-1/1.5 | d-1/0.003 |
| TE-6 | SL-6 | 100 | S-3/50 | 50 | p-1/1.8 | c-2/1.5 | d-1/0.003 |
| TE-7 | SL-7 | 50 | S-2/66.7 | 33.3 | p-1/2.5 | c-1/1.0 | d-1/0.002 |
| TE-8 | SL-8 | 50 | S-4/66.7 | 33.3 | p-1/2.5 | c-2/1.0 | d-1/0.002 |
| CE-1 | RSL-1 | 200 | R-1/33.3 | 66.7 | p-1/0.4 | c-1/2.5 | d-1/0.005 |
| CE-2 | RSL-2 | 200 | R-2/33.3 | 66.7 | p-2/0.4 | c-1/2.5 | d-1/0.005 |
| CE-3 | RSL-3 | 200 | R-3/33.3 | 66.7 | p-3/0.4 | c-1/2.5 | d-1/0.005 |
| CE-4 | RSL-4 | 100 | S-1/50 | 50 | — | — | — |
| CE-5 | RSL-5 | 100 | R-2/50 | 50 | p-1/1.8 | c-2/1.5 | d-1/0.003 |
| CE-6 | RSL-6 | 200 | S-1/33.3 | 66.7 | p-1/0.4 | c-1/0.05 | d-1/0.005 |
| CE-7 | RSL-7 | 200 | S-3/33.3 | 66.7 | p-1/0.4 | — | — |
| CE-8 | RSL-8 | 200 | *1/33.3 | 66.7 | p-1/0.4 | — | — |

In Table 3:
TE: Test Example
CE: Comparison Example
Type of Blast-furnace slag cement: As described in Table 2
Types of fluidizers, hardening accelerators and defoamers: As described in Table 1
Used amounts of fluidizers, hardening accelerators and defoamers: Mass parts of solid component per 100 mass parts of blast-furnace slag cement
*1: Type B blast-furnace slag cement (density = 3.04 $g/cm^3$; blain value = 3850 $cm^2/g$)

Part 4 (Preparation and Evaluation of Soil Cement Slurry)

TEST EXAMPLES 9-16 AND COMPARISON EXAMPLES 7-12

Soil cement slurry was prepared by using each example of slurry compositions for ground improvement prepared in Part 3 and evaluated as follows. The injected amount of slurry compositions for 1 m³ of ground improvement was determined such that the target uni-axial compressive strength at material age of 28 days would be over 5N/mm². A specified amount of each slurry composition for ground improvement prepared in Part 3 was firstly placed in a hobart mixer and then ground with the physical characteristics shown in Table 4 (mixture of cohesive soil obtained by digging ground and silica sand at mass ratio of 3/1) was added and mixed together to obtain the samples of soil cement slurry shown in Table 5. Conditions for preparation of each sample are also shown in Table 5.

TABLE 4

| Mass per volume (kg/m³) | Water content (%) | Particle density in mixed soil (g/cm₃) | Fraction of particles in mixed soil (%) | |
|---|---|---|---|---|
| | | | Cohesive soil | Silica sand |
| 1812 | 38.6 | 1.082 | 66.7 | 33.3 |

Evaluation of Physical Characteristics of Prepared Soil Cement Slurry

For each example of soil cement slurry prepared, the flow value immediately after the mixing with kneading, the flow value 90 minutes after the mixing with kneading, the air content and the uni-axial compressive strength were obtained as follows and the results are shown together in Table 5. Their emission rates of carbon dioxide are also shown.

Flow values: Flow tests were carried out both immediately and 90 minutes after the mixing with kneading and flow values after elevation difference (mm) were measured 15 times according to JIS-R5201.

Air content: Obtained according to JIS-A6201 (1977).

Uni-axial compression strength test: Compressive strength (N/mm²) at material age of 28 days was measured on molded articles obtained by using a mold with diameter 50 mm×height 100 mm according to JIS-A1108.

TABLE 5

Details of soil cement slurry

| | Slurry composition for ground improvement | | | Content of blast-furnace slag cement (kg) | Emitted amount of carbon dioxide (kg) | Evaluated physical characteristics | | | |
|---|---|---|---|---|---|---|---|---|---|
| | | | | | | Flow value (mm) | | Air content (%) | Uni-axial compressive strength (N/mm²) |
| | Type | Injected amount (kg) | Injection rate (volume %) | | | Right after | 90 minutes later | | |
| TE-9 | SL-1 | 1031 | 80 | 344 | 82 | 226 | 214 | 0.6 | 6.0 |
| TE-10 | SL-2 | 1031 | 80 | 344 | 68 | 229 | 226 | 0.5 | 6.3 |
| TE-11 | SL-3 | 1031 | 80 | 344 | 96 | 221 | 207 | 0.5 | 6.4 |
| TE-12 | SL-4 | 1031 | 80 | 344 | 82 | 223 | 212 | 0.6 | 6.0 |
| TE-13 | SL-5 | 688 | 46 | 344 | 82 | 227 | 214 | 0.6 | 9.1 |
| TE-14 | SL-6 | 688 | 46 | 344 | 96 | 224 | 213 | 0.6 | 9.0 |
| TE-15 | SL-7 | 416 | 29 | 344 | 68 | 231 | 215 | 0.5 | 13.3 |
| TE-16 | SL-8 | 416 | 29 | 344 | 82 | 236 | 218 | 0.5 | 12.7 |
| CE-9 | RSL-1 | 1031 | 80 | 344 | 41 | 208 | 163 | 0.6 | 3.2 |
| CE-10 | RSL-2 | 1031 | 80 | 344 | 151 | 215 | 142 | 0.6 | 2.8 |
| CE-11 | RSL-3 | 1031 | 80 | 344 | 192 | 220 | 121 | 0.6 | 5.3 |
| CE-12 | RSL-4 | 1031 | 46 | 344 | 82 | 136 | 105 | 2.8 | 4.2 |
| CE-13 | RSL-5 | 1031 | 46 | 344 | 151 | 225 | 164 | 0.9 | 5.5 |
| CE-14 | RSL-6 | 1031 | 80 | 344 | 82 | 210 | 153 | 1.2 | 4.6 |
| CE-15 | RSL-7 | 1031 | 80 | 344 | 96 | 202 | 125 | 3.2 | 3.8 |
| CE-16 | RSL-8 | 1031 | 80 | 344 | 137 | 223 | 162 | 3.7 | 4.7 |

In Table 5:
TE: Test Example
CE: Comparison Example
Injected amount: Injected amount (kg) of slurry composition for ground improvement per 1 m³
Injection rate: Rate of injection (volume %) of slurry composition for ground improvement per 1 m³
Content of blast-furnace slag cement: Content of blast-furnace slag cement (kg) per 1 m³
Emitted amount of carbon dioxide: Amount of carbon dioxide (kg) emitted for improving 1 m³ as calculated from the amount of portland cement used As can be understood from Table 5, each example of soil cement slurry is characterized by a small amount of carbon dioxide for improving 1 m³ of ground as compared with conventionally used Comparison Example 16 which employs Type B blast-furnace slag cement. Moreover, excellent fluidity and fluidity maintaining characteristics with flow values less than 200 mm are obtainable, and sufficiently satisfactory results in target uni-axial compressive strength is attained.

What is claimed is:

1. A method of preparing soil cement slurry, said method comprising the steps of:
preparing blast-furnace slag cement by mixing blast-furnace slag fine particles with fineness 3500-6500 cm²/g in an amount of 70-75 mass % and portland cement in an amount of 25-30 mass % for a total of 100 mass %; and
preparing a slurry composition for ground improvement by mixing said blast-furnace slag cement, water and an admixture to obtain said soil cement slurry, said admixture including a hardening accelerator comprising an alkali metal carbonate salt, a defoamer comprising polyalkylene glycol monoalkenyl ether, and a fluidizer selected from an alkali metal salt of water soluble vinyl copolymer obtained by alkali hydrolysis of copolymer of isobutylene and anhydrous maleic acid and having mass averaged molecular weight of 2000-70000 and an alkali metal salt of polyacrylic acid having mass averaged molecular weight of 1500-50000, such that the mass ratio between said water and said blast-furnace slag cement is adjusted to 45-230% and that 0.1-5 mass parts of said admixture are contained in 100 mass parts of said blast-furnace slag cement.

2. The method of claim 1 wherein said slurry composition for ground improvement contains 0.5-3 mass parts of said hardening accelerator, 0.002-0.01 mass parts of said defoamer and 0.3-3 mass parts of said fluidizer per 100 mass parts of said blast-furnace slag cement.

3. The method of claim 2 wherein said portland cement is normal Portland cement.

* * * * *